Figure 1:
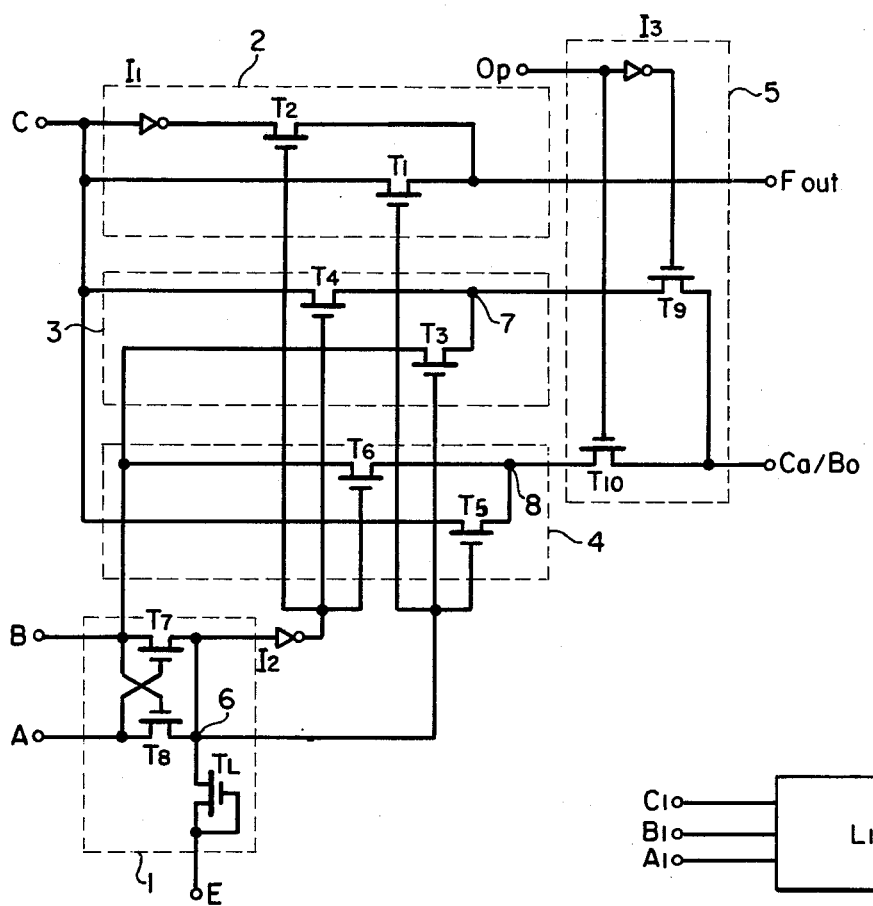

United States Patent [19]

Oguchi et al.

[11] 4,071,905
[45] Jan. 31, 1978

[54] FULL ADDER/SUBTRACTOR CIRCUIT EMPLOYING EXCLUSIVE OR LOGIC

[75] Inventors: Tetsuji Oguchi; Hirokazu Kawai, both of Tokyo, Japan

[73] Assignee: Nippon Electric Co., Ltd., Tokyo, Japan

[21] Appl. No.: 736,236

[22] Filed: Oct. 27, 1976

[30] Foreign Application Priority Data

Oct. 31, 1975  Japan ................................ 50-130534

[51] Int. Cl.$^2$ ............................................. G06F 7/50
[52] U.S. Cl. ................................................... 364/784
[58] Field of Search ................................ 235/176, 175

[56] References Cited

U.S. PATENT DOCUMENTS

| | | | |
|---|---|---|---|
| 3,612,847 | 10/1971 | Jorgensen | 235/176 |
| 3,843,876 | 10/1974 | Fett et al. | 235/175 |
| 3,919,536 | 11/1975 | Cochran et al. | 235/176 X |
| 3,932,734 | 1/1976 | Parsons | 235/175 |

*Primary Examiner*—David H. Malzahn

[57] ABSTRACT

A binary full adder/subtractor circuit includes an exclusive OR gate operating upon augend/minuend and addend/subtrahend binary input signals. The sum/difference output from the circuit is the carry/borrow input signal or its inverse depending upon the output state of the exclusive OR gate. The carry/borrow output of the circuit comprises either the carry/borrow input or the addend/subtrahend input, as determined by the output of the exclusive OR gate and by an operation (sum/difference) specifying input signal.

9 Claims, 2 Drawing Figures

FULL ADDER/SUBTRACTOR CIRCUIT EMPLOYING EXCLUSIVE OR LOGIC

The present invention relates to a full adder/subtractor circuit, and more particularly, to a binary full adder/subtractor circuit for performing addition and subtraction of binary operand signals.

A binary full adder/substractor circuit receives three input binary signals consisting of two operand signals and a carry or borrow signal, and performs the arithmatic operation of addition or substraction to generate two output binary signals comprising a result signal (sum or difference) and a carry or borrow signal. When commanded to perform addition, the circuit receives augend, addend, and carry signals and generates a sum signal, and a carry signal for processing by the stage of next higher significance. When commanded to perform subtraction, it receives minuend, subtrahend, and borrow signals and generates difference and next-stage borrow signals.

Heretofore known full adder/subtractor circuits are constructed of a large number of gate circuits, and the connections between these gate circuits are also very complex. In an circuit, generally a gate output signal is derived at the gate output which is delayed relative to an input signal. Since a signal must pass through gate circuits connected in a plurality of stages in a full adder/subtractor circuit, the output signal is delayed by an amount proportional to the number of stages of the gate circuits. In order that arithmetic operations for multi-digit numbers be performed simultaneously, full adder/subtractor circuits equal in number to the number of digits should be connected in parallel. Then, since a carry or borrow signal from an adjacent digit of a lower order is applied to an input of a full adder/subtractor circuit of an adjacent higher order digit with a delay proportional to the number of stages of the gate circuits as described above, a carry or borrow signal at the most significant digit would be delayed by a duration of a delay time in one full adder/subtractor circuit multiplied by the number of operand digits. Consequently, the time required for arithmetic operations is prolonged and it becomes necessary to adjust timing between a carry or borrow signal and a computational result signal.

An object of the present invention is therefore to provide a full adder/subtractor circuit which can shorten the time required for arithmetic operations.

Another object of the present invention is to provide a full adder/subtractor circuit which may be very simply constructed.

A further object of the present invention is to provide a full adder/subtractor circuit which can be constructed by employing field effect transistors (FET) which are very susceptible to circuit integration.

Still another object of the present invention is to provide a full adder/subtractor circuit of a quite novel construction which makes it possible to perform full addition/subtraction by employing only a single quarter adder.

A truth table representing operations required for a full adder/subtractor circuit is shown in the following TABLE 1:

| A | B | C | Op | F out | Ca/Bo | A | B | C | Op | F out | Ca/Bo |
|---|---|---|----|-------|-------|---|---|---|----|-------|-------|
| 0 | 0 | 0 | 1  | 0     | 0     | 0 | 0 | 0 | 0  | 0     | 0     |
| 1 | 0 | 0 | 1  | 1     | 0     | 1 | 0 | 0 | 0  | 1     | 0     |
| 0 | 1 | 0 | 1  | 1     | 0     | 0 | 1 | 0 | 0  | 1     | 1     |
| 1 | 1 | 0 | 1  | 0     | 1     | 1 | 1 | 0 | 0  | 0     | 0     |
| 0 | 0 | 1 | 1  | 1     | 0     | 0 | 0 | 1 | 0  | 1     | 1     |
| 1 | 0 | 1 | 1  | 0     | 1     | 1 | 0 | 1 | 0  | 0     | 0     |
| 0 | 1 | 1 | 1  | 0     | 1     | 0 | 1 | 1 | 0  | 0     | 1     |
| 1 | 1 | 1 | 1  | 1     | 1     | 1 | 1 | 1 | 0  | 1     | 1     |

In this table, the reference letter A represents one operand (augend/minuend) signal and B represents the other operand (addend/subtrahend) signal, while C represents a carry or a borrow signal from an adjacent lower order digit. $F_{out}$ represents a result (sum/difference) signal obtained by the arithmetic operation and Ca/Bo represents a next carry or borrow signal to an adjacent higher order digit. In addition, Op represents a command or selection signal commanding or selecting the operation mode (addition/subtraction). In this case, if Op is a logic "1," a summation and a next-stage carry signal are obtained, whereas if Op is a logic "0," a difference and a next-stage borrow signal are obtained.

A full adder/subtractor circuit which fulfills the relations represented in TABLE 1 and which has a very simple construction, can be provided according to the present invention. Nore particularly, a full adder/subtractor circuit according to the present invention comprises an exclusive OR circuit for generating an exclusive logical sum term of the A and B signals, a result signal generator, a carry and borrow signal generator, and an selection circuit for selecting either one of the carry and borrow signals from the carry and borrow signal generator to derive at its output either a next-stage carry or borrow signal.

The result signal generator receives the C signal and derives the C signal itself or its inverse (i.e., a true or a complement of the C signal) as its output result signal dependent upon the output of the exclusive OR circuit. More particularly, the result signal generator comprises means for selectively transferring the C signal or its compliment to its output terminal in response, respectively, to logical "0" and "1" signals appearing at the output of the exclusive OR circuit. The carry and borrow signal generator receives the B and C signals and derives one of these signals as a carry signal and the other of these signals as a borrow signal both in response to the output of the exclusive OR circuit. More specifically, the carry and borrow signal generator selectively transfers the B signal or the C signal into the selection circuit as a next carry signal in response, to logical "0" and "1" signals at the output of the exclusive OR circuit, respectively, and at the same time selectively transfers the C signal and the B signal into the selection circuit as a next borrow signal in response, to logical "0" and "1" signals appearing at the output of the exclusive OR circuit, respectively.

The exclusive OR circuit may comprise a quarter adder with an inverter connected to its output for obtaining a complementary output signal. The result signal generator circuit advantageously comprises a first transfer gate controlled by the true output of the exclusive OR circuit and supplied at its input with the C signal, a second transfer gate controlled by the complementary output of the exclusive OR circuit and supplied as its input with a complement of the C signal, and an output terminal for the result signal connected to the outputs of the first and second transfer gates. The carry and borrow signal generator advantageously consists of a carry signal generator circuit and a borrow signal generator circuit. The carry signal generator circuit comprises a third transfer gate controlled by the output of the exclusive OR circuit and supplied at its input with the B signal, a fourth transfer gate controlled by the complementary output of the exclusive OR circuit and supplied at its input with the C signal, and a carry signal output terminal connected to the outputs of the third and fourth transfer gates, The borrow signal generator circuit comprises a fith transfer gate controlled by the true output of the exclusive OR circuit and supplied at its input with the C signal, a sixth transfer gate controlled by the complementary output of the exclusive OR circuit and supplied at its input with the B signal, and a borrow signal output terminal connected to the outputs of the fifth and sixth transfer gates.

The selection circuit receives an addition command signal or a subtraction command signal and, in response to the addition command signal, delivers at its output the output signal of the carry signal generator circuit, correspondingly, in response to the subtraction command signal the selection circuit delivers at its outut the output signal of the carry signal generator circuit.

Figure 2:
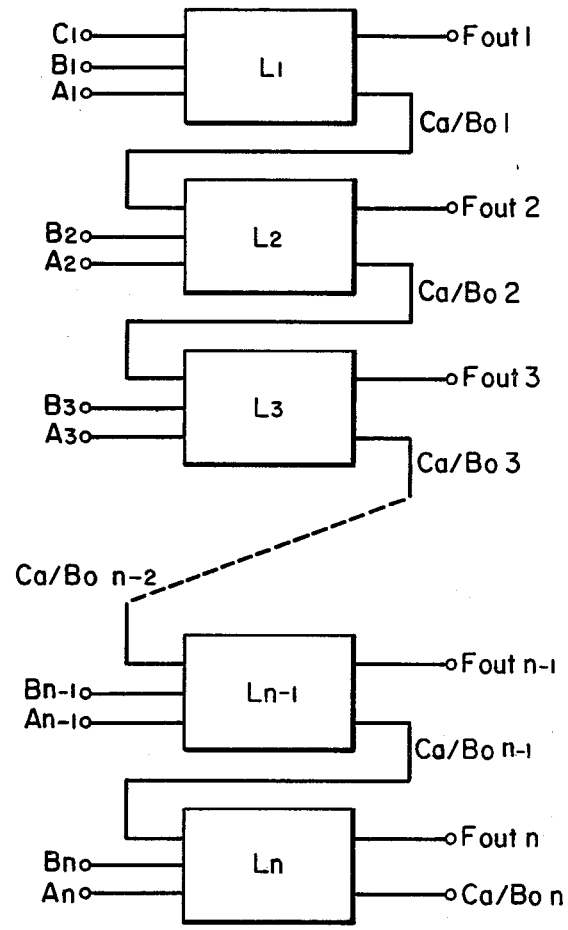

The present invention will now be described in more detail with reference to its prefered embodiment, illustrated in the accompanying drawings, in which:

FIG. 1 is a circuit diagram showing a preferred embodiment of the present invention, and FIG. 2 is a block diagram of a circuit arrangement for performing parallel addition-subtraction operations for multi-digit numbers.

Referring now to FIG. 1 of the drawings, an adder/subtractor circuit of the present invention includes inverter circuits $I_1$, $I_2$, and $I_3$, and field effect transistors (FET) $T_1$ through $T_{10}$ and $T_L$. The circuit of FIG. 1 comprises a quarter adder 1, a result signal generator circuit 2, a carry signal generator circuit 3, a borrow signal generator circuit 4 and an operation mode selection circuit 5.

The quarter adder 1 comprising three FET's $T_7$, $T_8$ and $T_L$, perform the exclusive OR logic function. That is its output is the exclusive logical sum of two applied input signals A and B. If the two input signals are of the same logical state, the output of quarter adder 1 is "0," whereas if they are different from each another, a "1" appears at the quarter adder output.

An input terminal for one operand signal A is connected to a gate electrode of FET $T_7$ and a source electrode of FET $T_8$. An input terminal for the other operand signal B is connected to a source electrode of FET $T_7$ and a gate electrode of FET $T_8$. Drain electrodes of FET's $T_7$ and $T_8$ are connected in common to an output terminal 6 of the quarter adder circuit 1. The load FET $T_L$, of which gate and drain electrodes are commonly connected, is connected between the output terminal 6 and a power source E.

The result signal generator circuit 2 includes FET $T_1$ forming a transfer gate responsive to the output of the quarter adder circuit 1 and FET $T_2$ forming a transfer gate responsive to an output of an inverter $I_2$. The inverter $I_2$ inverts the output of the quarter adder circuit 1 and generates its complement. An input terminal for the carry or borrow signal C from an adjacent lower order digit is connected to a source electrode of FET $T_2$ through an inverter $I_1$, and to an source electrode of FET $T_1$ directly. Drain electrodes of FET's $T_1$ and $T_2$ are both connected to an output terminal $F_{out}$ for the result signal. When the output of the quarter adder 1 is "0," FET $T_1$ becomes conductive, the signal applied to the terminal C, appears at the terminal $F_{out}$. On the other hand, when the output of the quarter adder 1 is "1," FET $T_2$ conducts and the inverse or complement of the signal applied to the terminal C is present at the terminal $F_{out}$.

The carry signal generator circuit 3 includes FET $T_3$ forming a transfer gate responsive to the output of the quarter adder 1 and FET $T_4$ forming a transfer gate responsive to the output of the inverter $I_2$. The input terminal for the carry or borrow signal C is connected to a source electrode of FET $T_4$, and the input terminal for the signal B is connected to a source electrode of FET $T_3$. Drain electrodes of FET's $T_3$ and $T_4$ are each connected to an output terminal 7 for the carry output signal.

When the output of the quarter adder 1 is "0," FET $T_3$ becomes conductive, so that at the output 7 of this circuit 3 corresponds to the signal applied to the terminal B. On the other hand, when the output of the quarter adder 1 is "1," FET $T_4$ conducts the output 7 of this circuit 3 corresponds to the signal applied to the terminal C.

The borrow signal generator circuit 4 includes FET $T_5$ forming a transfer gate responsive to the output of the quarter adder 1 and FET $T_6$ forming a transfer gate responsive to the output of the inverter $I_2$. The input terminal C is connected to a source electrode of FET $T_5$, and the input terminal B is connected to a source electrode of FET $T_6$. Drain electrodes of FET's $T_5$ and $T_6$ are commonly connected to an output terminal 8 to present the borrow signal.

When the output of the quarter adder 1 is "0," FET $T_5$ becomes conductive, so that the signal applied to the terminal C appears at the output 8 of the circuit 4. When the output of the quarter adder 1 is a "1," FET $T_6$ conducts and the signal applied to the terminal B is present at the output 8 of the circuit 4.

The selection circuit 5 includes FET $T_9$, FET $T_{10}$ and an inverter $I_3$. An input terminal for the operation command signal Op is connected to a gate electrode of FET $T_9$ via an inverter $I_3$, and to a gate electrode of FET $T_{10}$ directly. A source electrode of FET $T_9$ is connected to the output terminal 7 of the circuit 3, and a source electrode of FET $T_{10}$ is connected to the output terminal 8 of the circuit 4. Drain electrodes of FETs $T_9$ and $T_{10}$ are connected in common to an output terminal for the carry or borrow signal Ca/Bo.

When a "1" signal is applied to the terminal Op when addition is to be performed FET $T_9$ conducts, so that the output of the carry signal generator circuit 3 obtains at the terminal Ca/Bo. On the other hand, when a "0" signal is applied to the terminal Op to perform subtraction, FET $T_{10}$ becomes conductive, so that the output of the borrow signal generator circuit 4 becomes that at the terminal Ca/Bo.

In the above-described circuit arrangement, assuming now application of input binary signals to the respective input terminals, the following operations occur. For convenience of explanation, it is assumed that FET's $T_1$ through $T_{10}$ and $T_6$ are P-channel type field effect transistors and that a voltage of $-E$ volts (corresponding to the "0" level) has been applied to a terminal of the power source E. In addition, it is assumed that the voltage E of the power source has a far larger voltage value than the threshold voltage of the field effect transistors.

i. For the case when A, B and C are all at the "0" level, and Op is at the "1" level FETS $T_7$, $T_8$, $T_1$, $T_5$ and $T_9$ conducting, whereas FETS $T_2$, $T_4$, $T_6$ and $T_{10}$ are non-conductive. Accordingly, the signal $F_{out}$ is at the "0" level because the level of the C signal ("0") is passed through FET $T_1$, and the signal Ca/Bo is "0" because the level of the B signal ("0") is passed through FETS $T_3$ and $T_9$.

ii. For the case when A is at the "1" level, B and C are at the "0" level, and Op is at "1" level FETs $T_8$, $T_2$, $T_4$, $T_6$ and $T_9$ conduct whereas FETs $T_7$, $T_1$, $T_3$, $T_5$ and $T_{10}$ are non-conductive. Accordingly, the signal $F_{out}$ is a "1" because the inverted C signal is passed through FET $T_2$, but the signal Ca/Bo is "0" because the level of the C signal is passed through FETs $T_4$ and $T_9$.

In a similar manner, the reader may verify that the other combinations of respective input signals, given rise to the addition/subtraction operations according to the truth table of the Table 1. While the above-described operations are for the case of positive logic where $-E$ volts is chosen as "0" level and 0 volts is chosen as the "1" level, they are also valid for the case of negative logic if the levels are oppositely chosen. In addition, the desired operations are similarly achieved where $T_1$ through $T_{10}$ are implemented by N-channel type field effect transistors.

With the circuit arrangement constructed as described above, a unique full adder/subtractor circuit can be obtained, with a far smaller number of gates and components than a prior art full adder/subtractor and yet with the same logic functions as a prior art full adder/subtractor. In this circuit, upon obtaining a carry or borrow signal Ca/Bo, only one inverter stage inverter $I_2$ affects the circuit time delay, so that the delay in operational time is as small as $1 \times t$, assuming that $t$ represents the delay time through the inverter $I_2$.

While one preferred embodiment of the present invention has been described above, it is intended that the present invention should not be limited thereto but many modifications thereof could be made. For example, in place of FET's $T_1 \sim T_6$, $T_9$ and $T_{10}$ included in the circuits 2, 3, 4 and 5, bi-polar transistors or other transfer gates for transferring information from an input side to an output side only when they are conducting can be used. Moreover, in place of the quarter adder 1, another two-input exclusive OR circuit can be used.

Now referring to FIG. 2, an n-digit parallel adder/subtractor circuit shown therein will be described, which is constructed by combining n of the FIG. 1 full adder/subtractor circuits $L_1-L_n$, of FIG. 1. Though not shown in the figure, it is to be noted that a common operation-specifying command signal is applied to the terminals Op of all the n circuits $L_1$ to $L_n$. The signal $F_{out}1$ is delayed when data passes through a circuit path including the inverter $I_{11}$ and FET $T_{21}$, where it is assumed that $I_{1i}$ and $T_{2i}$ generally represent the inverter $I_1$ and FET $T_2$ in the i-th full adder/subtractor circuit $L_i$. Since the time delay at the moment when the $C_1$ signal has passed $I_{11}$ is equal to $t$, and since tha gate electrode of $T_{21}$ has been already at "0" level at the time $t$, the maximum delay of $F_{out}1$ is equal to $t$.

With regard to Ca/Bo 1, the following four routes exist:

1. $C_1$ passes through $T_{41}$ and $T_{91}$;
2. $C_1$ passes through $T_{51}$ and $T_{101}$;
3. $B_1$ passes through $T_{31}$ and $T_{91}$; or
4. $B_1$ passes through $T_{61}$ and $T_{101}$.

In the case of route (1) above, since the signal passes through $I_{21}$, the level of the gate electrode of $T_{41}$ is turned to "0" with a time delay of $t$, and at that moment the gate electrode of $T_{91}$ is already at "0" level, so that the time delay of Ca/Bo 1 is equal to $t$. Likewise in the case of route (2) above, there is no influence of an inverter and thus no time delay. In the case of route (3) or (4) above, since the signal passes through $T_{31}$ or $I_{21}$, respectively, the time delay is equal to $t$.

Now let us consider the time delay of $F_{out}2$ and Ca/Bo 2. With regard to $F_{out}2$, since the signal $C_2$, that is, Ca /Bo 1 is delayed by a duration of $1 \times t$ when it passes through the route including $I_{12}$ and $T_{22}$, and since the signal Ca/Bo 1 has been delayed already by a duration of $1 \times t$, an overall delay of $2 \times t$ expected.

With regard to Ca/Bo 2, the following four routes exist similar to those for Ca/Bo 1:

i. Ca/Bo 1 passes through $T_{42}$ and $T_{92}$;
ii. Ca/Bo 1 passes through $T_{52}$ and $T_{102}$;
iii. $B_2$ passes through $T_{32}$ and $T_{92}$; or
iv. $B_2$ passes through $T_{62}$ and $T_{102}$.

The input signal Ca/Bo 1 is expected to have a time delay of $t$, while the input signal $B_2$ is applied without delay. In the case of route (i) above, at a time $t$ the level of the gate electrodes of $T_{42}$ and $T_{92}$ has been already turned to "0," so that the time delay for Ca/Bo 2 can be small as $t$. Similarly, in the case of route (ii), (iii) or (iv) above, the time delay could be as small as $t$.

Proceeding, with regard to $F_{out}3$, although a time delay of $t$ is expected in $I_{13}$ and $T_{23}$, the time delay for Ca/Bo 2 is equal to $t$, and after all the overall time delay could be as small as $2t$.

As will be seen from the above-described analysis, even in the case of parallel addition/subtraction of multi-digit numbers, it is only necessary to expect a delay corresponding to at most two stages of gates for $F_{out}$ and a delay corresponding to at most one stage of gating for Ca/Bo. In addition, since the number of required transistors is small, circuit integration is easier and less expensive, and also electric power consumption is reduced.

What is claimed is:

1. A circuit comprising an exclusive logic sum termn generator generating an exclusive logic sum term of a first and second operand signals, a result signal generator receiving a third signal representing one of carry and borrow information and deriving a result signal from one of said third signal and an inverted signal thereof in response to the output of said exclusive logic sum term generator, a carry and borrow signal generator deriving one of said third signal and said first operand signal as a carry signal and the other of said third signal and said first operand signal as a borrow signal both in response to said output of said exclusive logic sum term generator, and a selection circuit selecting one of said carry signal and said borrow signal in response to a command signal commanding one of addition and subtraction.

2. The circuit of claim 1, in which said first operand signal is a binary signal representing one of addend and subtrahend, while said second operand signal is a binary signal representing one of augend and minuend.

3. A circuit comprising a first input terminal for receiving a first binary signal representing one of an augend and minuend, a second input terminal for receiving a second binary signal representing one of an addend and subtrahend, a third input terminal receiving a third binary signal representing one of carry and borrow, a control terminal receiving a control signal commanding one operation of addition and subtraction, a first output terminal for supplying a first output binary signal representing a result of addition or subtraction, a second output terminal for supplying a second output binary signal representing the next carry or next borrow, a quarter adder circuit coupled with said first and second input terminals and generating true and complementary outputs of an exclusive logic sum term of said first and second binary signals, a result signal generator coupled with said third input terminal and said first output terminal and including means for selectively transferring true and a complementary version of said third binary signal to said first output terminal in response to "0" and "1" binary signals supplied by said true output of said quarter adder circuit, respectively, a carry and borrow signal generator coupled with said second and said third input terminals and with said quarter adder circuit, and a selection circuit coupled with said control terminal, said carry and borrow signal generator, and said second output terminal, said carry and borrow signal generator selectively transferring said second binary signal and said third binary signal into said selection circuit as a next carry signal responsive to "0" and "1" binary signals of said true output of said quarter adder circuit, respectively, said carry and borrow signal generator selectively transferring said third binary signal and said second binary signal into said selection circuit as a next borrow signal responsive to "0" and "1" binary signals of said true output of said quarter adder circuit, respectively, and said selection circuit transferring one of said next carry signal and said next borrow signal to said second output terminal in response to said control signal.

4. In combination in a full adder-subtractor circuit, first and second output terminals for respectively supplying output result and carry-borrow signals, first through fourth input terminals for respectively receiving first and second operand signals, a carry-borrow signal and an operation specifying signal, exclusive OR logic having an output and input means connected to said first and second operand receiving input terminals, result circuit means connecting said third input terminal and said first output terminal and connected to exclusive OR logic means for selectively supplying to said first output terminal the carry-borrow input signal present at said third input terminal or its inverse depending upon the output of said exclusive OR logic means, carry circuit means and borrow circuit means each having an output and input means connected to said third input terminal and one of said first and second input terminals for supplying at their said output terminals one and the other of the operand signal and the carry-borrow input signal dependent upon and responsive to the output of said exclusive OR logic means, and selection means connected to said fourth input terminal, said second output terminal and said outputs of said carry and borrow circuit means for operatively connecting the output of a selected one of said carry circuit means and said borrow circuit means responsive to the operation-specifying signal present on said fourth input terminal.

5. In combination, plural full adder/subtractor circuits, each of said full adder/subtractor circuits comprising first and second output terminals for respectively supplying output result and carry-borrow signals, first through fourth input terminals for respectively receiving first and second operand signals, a carry-borrow signal and an operation specifying signal, exclusive OR logic having an output and input means connected to said first and second operand receiving input terminals, result circuit means connecting said third input terminal and said first output terminal and connected to said exclusive OR logic means for selectively supplying to said first output terminal the carry-borrow input signal present at said third input terminal or its inverse depending upon the output of said exclusive OR logic means, carry circuit means and borrow circuit means each having an output and input connected to said third input terminal and one of said first and second input terminals for supplying at their said output terminals one and the other of the operand signal and the carry-borrow input signal dependent upon and responsive to the output of said exclusive OR lobic means, and selection means connected to said fourth input terminal, said output terminal and said outputs of said carry and borrow circuit means for operatively connecting the output of a selected one of said carry circuit means and said borrow circuit means responsive to the operation-specifying signal present on said fourth input terminal, and means for cascade connecting said plural adder-subtractor circuits, said cascade connecting means comprising means for connecting said second output terminal of plural of said circuits to said third input terminal of a following one of said cascade connected circuits.

6. In combination in a full adder circuit, sum and carry output terminals, first and second operand receiving and carry input terminals, exclusive OR logic having an output and inputs means connected to said first and second operand receiving, input terminals, sum circuit means connecting said carry input terminal and said sum output terminal and connected to said exclusive OR logic means for selectively supplying to said sum output terminal the carry input signal present at said carry input terminal or its inverse depending upon the output of said exclusive OR logic means, and carry circuit means having an output and input connected to said carry input terminal and one of said first and second operand input terminals and connected to said exclusive OR logic means for supplying its said output terminals one of the operand signal or the carry input signal responsive to the output of said exclusive OR logic means.

7. In combination in a full subtractor circuit, difference and borrow output terminals first and second operand receiving and borrow input terminals, exclusive OR logic having an output and inputs means connected to said first and second operand receiving input terminals, difference circuit means connecting said borrow input terminal and said difference output terminal and connected to said exclusive OR logic means for selectively supplying to said difference output terminal the borrow input signal present at said borrow input terminal or its inverse depending upon the output of said exclusive OR logic means, and borrow circuit means having an output and inputs connected to said borrow input terminal and one of said first and second operand input terminals, and connected to said exclusive OR logic means for supplying its said output terminal one of the operand signal or the borrow input signal responsive to the output of said exclusive OR logic means.

8. A full adder/subtractor circuit comprising an exclusive OR circuit for generating an exclusive logical sum term of a first signal and a second signal; an inverter for inverting the output of said exclusive OR circuit; a result signal generator circuit including a first transfer gate controlled by the output of said exclusive OR circuit and supplied at its input with a third signal, a second transfer gate controlled by the output of said inverter and supplied at its input with an inverted signal of said third signal, and as a result signal output terminal connected in common with output terminals of said first and second transfer gates; a carry signal generator circuit including a third transfer gate controlled by the output of said exclusive OR circuit and supplied at its input with said first signal, a fourth transfer gate controlled by the output of said inverter and supplied at its input with said third input, and a carry signal output terminal connected in common with output terminals of said third and fourth transfer gates; a borrow signal generator circuit including a fifth transfer gate controlled by the output of said exclusive OR circuit and supplied at its input with said third signal, a sixth transfer gate controlled by the output of said inverter circuit and supplied at its input with said first signal, and a borrow signal output terminal connected in common with output terminals of said fifth and sixth transfer gates; and a selection circuit connected to said carry signal output terminal and said borrow signal output terminal for selecting one of the carry signal and the borrow signal in response to a signal commanding one of addition and subtraction.

9. A full adder/subtractor circuit as claimed in claim 8, wherein said exclusive OR circuit comprises a first field effect transistor, a source and a gate electrode of said first transistor being supplied with said first and second signals, respectively, a second field effect transistor, a source and a gate electrode of said second transistor being supplied with said second and first signals, respectively, drain electrodes of said first and second transistors being commonly connected at an output terminal of said exclusive OR circuit, and a load means connected between said output terminal and a power source.

* * * * *

UNITED STATES PATENT OFFICE
CERTIFICATE OF CORRECTION

Patent No. 4,071,905              Dated January 31, 1978

Inventor(s) Oguchi, Tetsuji, et al.

It is certified that error appears in the above-identified patent and that said Letters Patent are hereby corrected as shown below:

Column 6, line 43: Change "termn" to --term--;

Column 8, line 16: change spelling of "lobic" to --logic--;

Column 9, line 4: delete the word "as".

Signed and Sealed this

Twenty-third Day of May 1978

[SEAL]

Attest:

RUTH C. MASON
Attesting Officer

LUTRELLE F. PARKER
Acting Commissioner of Patents and Trademarks